United States Patent [19]

Lemon, III

[11] Patent Number: 5,062,871
[45] Date of Patent: Nov. 5, 1991

[54] SYSTEM FOR LOCALIZING A PORTION OF A STRUCTURE FOR TREATMENT

[75] Inventor: Walter B. Lemon, III, Mesa County, Colo.

[73] Assignee: Seth C. Hunt, Denver, Colo.

[21] Appl. No.: 435,089

[22] Filed: Nov. 13, 1989

[51] Int. Cl.$^5$ .......... B01D 46/42; B08B 7/04
[52] U.S. Cl. .................. 55/259; 55/385.2; 55/429; 98/115.3; 98/115.4; 134/200; 248/98; 312/1
[58] Field of Search ............ 55/84, 220, 259, 385.2, 55/428, 429; 312/1, 3; 134/21, 200; 98/1.5, 31.5, 33.1, 34.5, 115.3, 115.4; 248/95, 97–99

[56] References Cited

U.S. PATENT DOCUMENTS

| | | | |
|---|---|---|---|
| 4,505,190 | 3/1985 | Fink et al. | 98/115.1 |
| 4,626,291 | 12/1986 | Natale | 134/21 |
| 4,682,448 | 7/1987 | Healey | 55/385.2 |
| 4,765,352 | 8/1988 | Strieter | 55/DIG. 29 |
| 4,783,129 | 11/1988 | Jacobson | 312/3 |
| 4,809,391 | 3/1989 | Soldatovic | 55/385.2 |
| 4,820,000 | 4/1989 | Jacobson | 134/6 |
| 4,842,347 | 6/1989 | Jacobson | 312/3 |
| 4,865,401 | 9/1989 | Jacobson | 312/3 |
| 4,883,512 | 11/1989 | Griffis | 55/385.2 |
| 4,902,315 | 2/1990 | Spicer | 55/385.2 |
| 4,911,191 | 3/1990 | Bain | 55/385.2 |

*Primary Examiner*—Bernard Nozick
*Assistant Examiner*—James P. Mackey
*Attorney, Agent, or Firm*—Donald W. Margolis; Edwin H. Crabtree

[57] ABSTRACT

A system and method for isolated removal and/or repair of a localized area in a structure, such as a ceiling or a wall. The system includes an adjustable support structure to which a debris containment bag is secured. The support structure is designed to adjustably hold the bag against a wall, ceiling or other structure so that a person can perform work on that structure from within the bag. In preferred embodiments the bag is fluid impermeable, carries one or more glove body which allows an operator to work within the bag on any isolated to-be-treated portion of a structure, a hose for controllably spraying liquids into the bag, and a vacuum hose for exhausting gases from the bag. The vacuum hose creates a negative pressure within the bag in a manner which reduces or eliminates the ability for material within the bag, such as asbestos, from becoming air entrained.

14 Claims, 1 Drawing Sheet

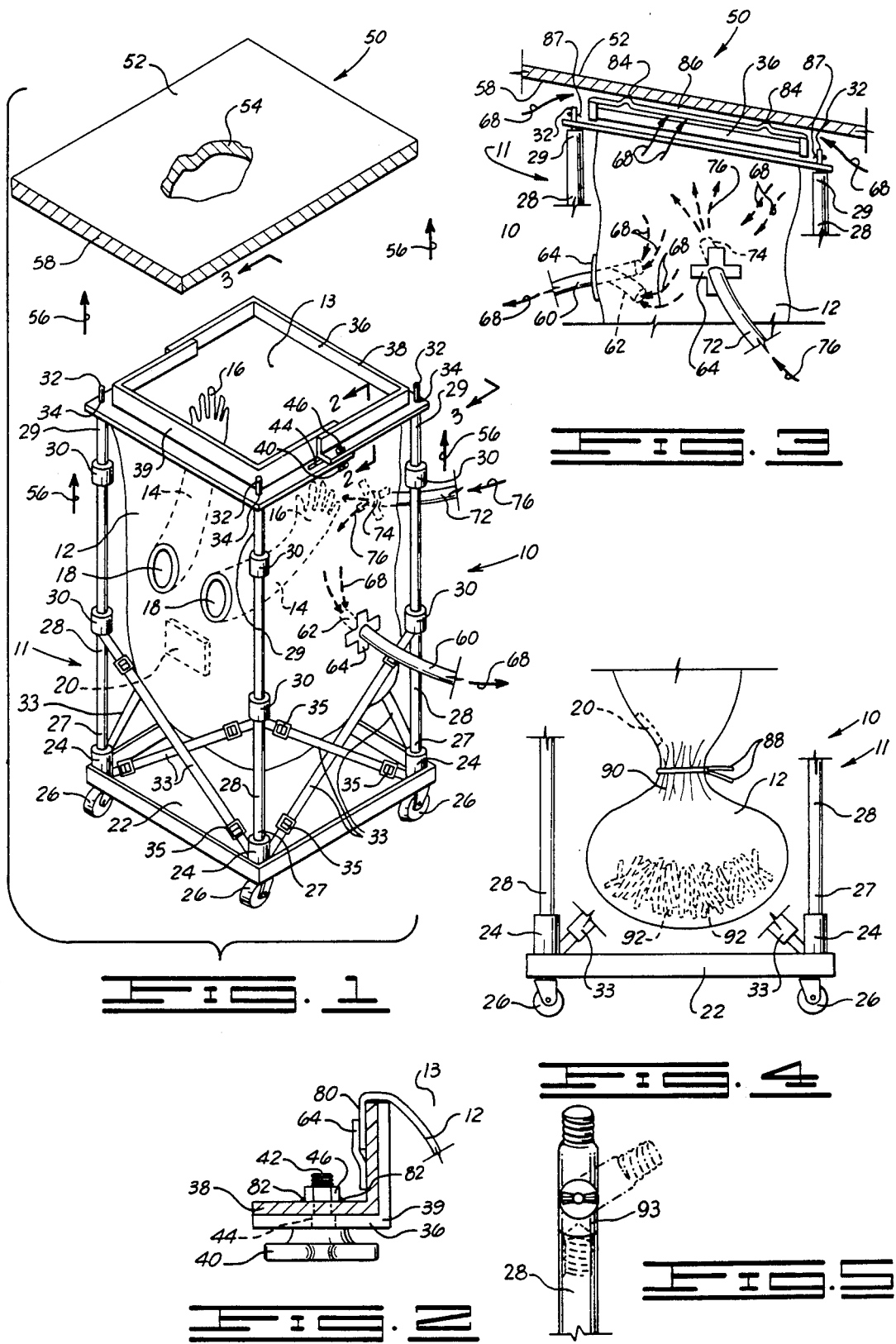

SYSTEM FOR LOCALIZING A PORTION OF A STRUCTURE FOR TREATMENT

BACKGROUND OF THE INVENTION (1) Field of the Invention

The subject invention relates to an apparatus and method for repairing or maintaining a wall, ceiling or other structural building element. More specifically it is related to an apparatus and method which is intended for use in asbestos removal and repair of a localized area in a structural building element, such as a wall or ceiling, and similar applications.

(2) Discussion of the Prior Art

It is well known in the handling of asbestos and its removal from schools and other buildings to use HEPA vacuum equipment such as described in U.S. Pat. No. 4,523,936 to Disanza, Jr. Similar type of vacuum equipment is described is U.S. Pat. Nos. 3,740,933 to Hollowell, 3,771,664 to Schrink et al and 4,133,769 to Morgan. However, this type of equipment has not been used for drawing asbestos entrained air into a containment bag having a glove entry and associated with a support structure.

U.S. Pat. No. 4,477,490 to Weisberg has been noted as describing a process of coating asbestos fibers with a pre-polymer and inorganic catalyst. However, this patent does not address the problem of repairing or maintaining a ceiling or other structure with asbestos fibers.

Of perhaps the greatest interest to the present invention is the use of an isolated portable enclosure designed to seal an open ceiling area during inspection, maintenance or removal of asbestos materials. The known enclosure is sold under the trademark of "Kontrol Kube", is distributed by a Fiberlock Technologies, Inc., and is noted as being described at page 42 of the November 1988 issue of *School and College* magazine. The Kontrol Kube enclosure provides a "phone booth" type work area for receiving a workperson wearing an isolation suit therein, and may include a ladder to allow that person to perform inspection, maintenance or removal of asbestos materials from a ceiling. A HEPA vacuum cleaner is positioned outside the enclosure with the vacuum hose inserted inside the work area. The above mentioned Kontrol Kube does not contemplate a mode of asbestos inspection or removal operation which does not require the workperson to use a full asbestos isolation suit.

It is thus seen, that it would be desirable to provide a simple and inexpensive apparatus and method for safely and efficiently inspecting or removing asbestos material from a localized area of a structure, such as a ceiling or a wall, without the need to seal off an entire room or section of a building, or the need of wearing a full asbestos isolation suit.

SUMMARY OF THE INVENTION

In view of the foregoing, it is an object of the present invention to provide an apparatus and method for safely and efficiently inspecting or removing asbestos material from a structure without the need to wear a full asbestos isolation suit.

It is another object of the present invention to provide an apparatus for asbestos removal and repair of a localized area of a structure, such as a ceiling or a wall.

Still another object of the invention is to eliminate the need of sealing off an entire room or section of a building in order to make a repair or maintain a structure, such as a ceiling or a wall having asbestos fibers.

Yet another object of the present invention is to provide a simple and inexpensive apparatus and method for asbestos removal and repair of a structure, such as a ceiling or a wall.

The foregoing objects of the present invention are obtained by providing an apparatus and method for asbestos removal and repair of a localized area in a ceiling. The preferred embodiment of the apparatus includes a support structure, such as an upright stand with a bag attachment frame affixed to the top thereof. An asbestos containment bag having a glove entry is secured to the bag attachment frame. The combined structure can be used to secure the bag against a wall, ceiling or other structure so that a person can perform work on that structure from within the bag by use of the glove entry without exposing the area outside of the bag to asbestos air entrainment.

These and other objects of the present invention will become apparent to those skilled in the art from the following detailed description, showing the contemplated novel construction, combination, and elements as herein described, and more particularly defined by the appended claims, it being understood that changes in the precise embodiments of the herein disclosed invention are meant to be included as coming within the scope of the claims, except insofar as they may be precluded by the prior art. In one embodiment, a negative air pressure device, such as a vacuum system, is connected to the bag in a manner which reduces or eliminates the ability for material within the bag, such as asbestos, from air entrainment.

BRIEF DESCRIPTION OF THE DRAWINGS

The accompanying drawings illustrate complete preferred embodiments of the present invention according to the best modes presently devised for the practical application of the principles thereof, and in which:

FIG. 1 is a top perspective view, partially in phantom, of the apparatus of the present invention for asbestos removal and repair, shown disposed under a fragmentary portion of a damaged area in a ceiling tile;

FIG. 2 is an enlarged sectional side elevational view, taken along lines 2—2 of FIG. 1, of a portion of an attachment frame for an asbestos containment bag;

FIG. 3 is a fragmentary side elevational view, partially in phantom, taken along lines 3—3 of FIG. 1, of the asbestos containment bag, and slightly modified apparatus of the present invention shown connected to a sloping ceiling, and showing additional details of vacuum and water hose connections to the bag;

FIG. 4 illustrates a fragmentary side elevational view, partially in phantom, of the lower portion of the apparatus an illustrating debris which has been washed down and collected in the bottom of the containment bag, and with the bag sealed;

FIG. 5 is an enlarged view, partially in phantom, showing the details of an adjustable angle adapter connected to a telescopic support rod.

DESCRIPTION OF THE PREFERRED EMBODIMENTS

In FIG. 1 an apparatus for asbestos removal and repair of a localized area in a structure, such as a ceiling or a wall, is shown and designated by general reference numeral 10. In one preferred embodiment, apparatus 10 includes an upright stand, generally 11, which is used to support a debris and asbestos containment bag 12. Asbestos containment debris and asbestos containment bag 12 may be of the polyvinyl chloride type made by Abatement Technologies of Duluth, Georgia and having a brand name "Iso-Bag", or of any other similar fluid and asbestos impermeable bag of the type used and approved for asbestos removal. The debris and asbestos containment bag 12 includes bag top opening 13, and in the present invention, carries a pair of fluid and asbestos impermeable seamless sleeves 14, both of which terminate in integral fluid and asbestos impermeable five finger gloves 16. Each of sleeves 14 includes external sleeve openings 18 through which to receive a hand and arm of an operator using apparatus 10 when making a structural repair. In preferred embodiments, debris and asbestos containment bag 12 also includes an interior pouch 20 which is useful for placing and holding tools and other items within debris and asbestos containment bag 12 before it is connected to the structure which is to be repaired. This makes it possible for an operator using apparatus 10 to avoid the need to disengage debris and asbestos containment bag 12 from a structure to which it has been attached for repair.

Stand 11 of apparatus 10 includes a bottom pan 22. Upwardly extending rod sleeves 24 are secured to each of the four corners of pan 22. Attached to the bottom of pan 22 are a plurality of caster wheels 26 used for ease in moving apparatus 10 into juxtaposition to the structure which is to be repaired or removed. Each rod sleeve 24 receives a first end 27 of a telescoping support rod 28. The support rods 28 are made up of a lower section 28a, a middle section 28b, and an upper section 28c. The sections 28a, 28b, and 28c, are secured together using tightening knobs 30. The knobs 30 include a lower knob 30a and upper knob 30b. When knob 30a is loosened, the middle section 28b collapses inside the lower section 28a. Likewise, when the upper tightening knob 30b is loosened, the upper section 28c collapses inside the middle section 28b. When it is desired to telescope the support rods 28, as shown in FIG. 1, the middle section 28b is pulled upwardly to its full extended position and the lower knob 30a is tightened. The upper section 28c is then pulled upwardly to a desired length and the upper knob 30b is tightened. The tightening knobs 30 serve to stabilize and secure each support rod 29 when it is extended. A second end 29 of each support rod 28 includes an extended pin 32. The second end 29 is located at the upper end of the upper Section 28c while the first end 27 is located at the lower end of the lower section 28a of the support rods 28. Each extended pin 32 is inserted through a preexisting hole 34 in a corner of an adjustable bag attachment frame 36. To improve the stability of apparatus 10 and to enhance the rigidity of support rods 28 a pair of crossed support straps 33, each with an adjusting buckle 35, are secured along the perimeter of the system between each pair of adjacent support rods 28.

Bag attachment frame 36 is constructed of a pair of "C"-shaped frame pieces 38 and 39. As shown in FIG. 2, which is an enlarged sectional side elevational view, taken along lines 2—2 of FIG. 1, each frame piece 38 and 39 has an "L"-shaped cross section. "C" frame pieces 38 and 39 are joined together at the two locations at which they overlap by a tightening handle 40 which includes a screw 42 which is received through a nut 46. Only one of tightening handle is shown in FIG. 1. Other handles 40 with screws 42 are hidden behind the other side of attachment frame 36 in FIG. 1. Elongated slots 44 are located in "C" frame piece 39. When handles 40 are loosened, screws 42 can slide in elongated slots 44 in frame piece 39. This allows an operator to move frame pieces 38 and 39 towards and away from one another to decrease or increase the area within frame 36. By making frame 36 adjustable, different sizes of bags 12 with different size bag openings 13 can be used, to thereby best match the size of the work area under repair.

Referring again to FIG. 1, in which there is shown a top perspective view, partially in phantom, of apparatus 10 disposed under a fragmentary portion of a damaged area in a ceiling, having a general reference numeral 50. In the embodiment shown, ceiling 50 is represented as including an asbestos ceiling tile 52. Tile 52 is shown having a damaged area 54. When telescoping support rods 28 are raised they carry frame 36, as indicated by Arrows 56 in FIG. 1, as well as debris and asbestos containment bag 12 secured thereto into engagement with the bottom 58 of ceiling tile 52, as most clearly shown in FIG. 3. It will be noted that frame 36 will first be adjusted to a size which is large enough to more than completely surround damaged area 54, so that there is no risk of asbestos falling outside of bag 12 during repair operations.

When apparatus 10 is in place with frame 36 and opening 13 of debris and asbestos containment bag 12 flush against ceiling tile 52, a vacuum hose 60 having a nozzle end 62 is inserted into the debris and asbestos containment bag 12 through, for example, a clean "X" shaped cut. After nozzle 62 has been inserted in the "X" shaped cut, the cut and the adjacent portion of hose 60 is closed and sealed, for example using duct tape 64. It is important that a tight seal is provided so that there is no leakage of asbestos entrained air through the cut or around hose 60. When the vacuum system is operated to produce a negative pressure within bag 12, the vacuum drawn is indicated by arrows 68, as shown in FIGS. 1 and 3. The negative pressure which is induced within bag 12 reduces the chance of any asbestos exiting from bag 12 and becoming airborne during maintenance or repair work.

In the preferred operation, at the same time that vacuum hose 60 is installed in the debris and asbestos containment bag 12, a water hose 72 with a spray nozzle end 74 is also inserted into bag 12. Hose 72 is connected into and through bag 12 using substantially the same method of cutting containment bag 12 and sealing the cut and around hose 72 using duct tape 64. When water, usually with added surfactant, is used to wet down the damaged area 54 and the debris and asbestos material as it is removed, as detailed below, a water spray, as indicated by dotted arrows 76, is used to reduce the chance of any asbestos becoming airborne during maintenance or repair work. It will be noted that vacuum nozzle 62 is directed downwardly to prevent it from exhausting excessive amounts of water spray 76 from within bag 12.

Referring again to FIG. 2, which is an enlarged cross section of the frame 36 with frame pieces 38 and 39 and taken along lines 2—2 shown in FIG. 1, further illustrates the manner in which bag 12 is secured to frame 36. It can be seen that an edge 80 around opening 13 of bag 12 is folded over the top of frame pieces 38 and 39. Then, using duct tape 64 edge 80 of containment bag 12 is fixed around the perimeter of frame 36. While the use of tape 64 to secure the containment bag 12 to frame 36 is shown in FIG. 2, it should be kept in mind that various other means for attaching bag 12 to frame 36 may be used prior to suspending the debris and asbestos containment bag 12 below a work area.

Referring again to FIG. 3, which is a fragmentary side elevational view, partially in phantom, taken along lines 3—3 of FIG. 1, showing bag 12 of system of 10 the present invention showing frame 36 is disposed against tile 52 of sloping ceiling 50. By the proper adjustment of telescoping support rods 28 apparatus 10 is readily adaptable to be secured to both horizontal or sloped ceilings, as well as to walls and other structures.

In the modification shown in FIG. 3, the upper edge of frame pieces 38 and 39 which comprise frame 36 include a plurality of spaced apart upwardly extending bumps 84. Bumps 84 serve to further secure and seal edge 80 of containment bag 12 to ceiling tile 52. An open space 86 extends between each adjacent bump 84 around the perimeter of frame 36. Open space 86 allows air, also indicated by arrows 68 to be drawn from the outside to the inside of containment bag 12, thus producing a negative air flow into, and a negative pressure within bag 12. The negative air flow and pressure is important since it retains any airborne entrained asbestos which may occur during the repair or maintenance of ceiling tile 52 within debris and asbestos containment bag 12. Also shown in FIG. 3 are cotter keys 87 extending through apertures, not shown, of pins 32 of support rods. Cotter keys 87 serve to lock frame 36 on top of support rods 28.

In the operation of the present invention, edge 80 of debris and asbestos containment bag 12 is folded over frame 36 and tightly sealed using duct tape 64, or the like, as shown in FIG. 2. First end 27 of support rods 28 is inserted into rod sleeves 24. If desired, the first end 27 can be further secured to rod sleeve 24 by inserting a bolt therethrough and securing it with a wing nut, or the like. At this time frame 36 with debris and asbestos containment bag 12 is placed on second end 29 of support rods 28 with pins 32 received through holes 34 in the corners of frame 36 and held thereon by inserting cotter keys 87 through the apertures in pins 32. The telescoping support rods 28 are then moved upwardly with bumps 84 and a portion of the debris and asbestos containment bag 12 engaging the bottom surface 58 of ceiling tile 52 and encircling the to-be-repaired damaged area 54. Knobs 30 and support straps 33 are now tightened to provide rigidity to the overall apparatus 10.

Small "X" shaped slits are cut in containment bag 12 normally in an area above sleeve openings 18 and vacuum hose 60 and water hose 72 are introduced into containment bag 12. The slits in and around vacuum hose 60 and water hose 72 are taped tightly with duct tape 64 to provide a fluid tight seal. Vacuum hose 60 is now turned on to establish a negative air flow within bag 12. Also the work area above bag 12 is wetted with a spray of amended water, but not in an amount or weight which might cause containment bag 12 to tear or fall.

The operator of apparatus 10 now inserts his or her hands and arms in sleeves 14 and gloves 16. In this manner the operator is now able to repair or remove the asbestos material in the damaged area 54 using tools which have been previously placed in interior pouch 20. If required, a second worker can simultaneously control the wetting of the asbestos material in the work area with hose 72. When the work is completed, any tools used are washed with spray nozzle 74 along with the interior of the debris and asbestos containment bag 12.

Any washed down debris 92 is now collected in the bottom of the debris and asbestos containment bag 12.

FIG. 4 illustrates a side view of the lower portion of stand 11 of apparatus 10 after the repair or maintenance of ceiling 50 has been completed. The inside of the debris and asbestos containment bag 12 is completely washed down along with any tools used by using water spray nozzle 74. The tools, if used, are placed in the inside tool pouch 20, bag 12 is sealed below pouch 20, and pouch 20 is carefully removed from the sealed bag in a manner which will avoid the air entrainment of any asbestos. Then duct tape or a plastic tie 88 is used to tie off bag 12 to form a neck 90 close to the top of the debris and asbestos containment bag 12. In an alternative procedure, sleeves 14 and gloves 16 can be pulled inside-out from the containment bag 12, and wrapped tightly around neck 90 in a similar fashion as with plastic tie 88. The washed down debris collected in the bottom of the debris and asbestos containment bag 12 is indicated by numeral 92.

While the debris and asbestos containment bag 12 is still in place on frame 36, and vacuum hose 60 is still operating, an encapsulant paint can be sprayed on the repaired ceiling to seal it. Finally the debris and asbestos containment bag 12 is inserted into a heavy duty disposal bag, such as a 6 mill plastic, not shown in the drawings. Telescoping support rods 28 are now lowered, support straps 33 are loosened, and edge 80 of the debris and asbestos containment bag 12 removed from the sides of bag attachment frame 36. At this time the debris and asbestos containment bag 12 with washed down asbestos debris 92 safely secured in bag 12 is allowed to rest on top of bottom pan 22. The debris and asbestos containment bag 12, preferably within a more heavy duty bag, can now be removed for disposal under acceptable procedures.

As a matter of additional information, FIG. 5 shows how angle adapter 93 screws onto telescopic support rod 28. Angle adapter 93 has a joint with ¼" bolt and wing nut to adjust the angle of the apparatus to conform to the ceiling angle. In the embodiment shown, the maximum angle the apparatus can be adjusted to with the angle adjusters 93 is 45 degrees.

The exterior frame shown is one of many ways to provide a safe means of securing the debris and asbestos containment bag 12 to the frame 36. To insure that the debris and asbestos containment bag 12 does not tear and fall due to the weight of the washed down debris 92 in the bottom of the debris and asbestos containment bag 12, an exterior, expandable frame, not shown in the drawings, can be secured around the outside of the upwardly extending portion of frame 36 in a press fit with edge 80 of the debris and asbestos containment bag 12 therebetween. Other sizes and shapes of frame are also included within the teaching of the present invention.

While in FIG. 1, an asbestos ceiling 50 with ceiling tile 52 and damaged area is shown, it should be kept in mind that apparatus 10 can be used in a variety of applications with different types of ceilings, walls and other structures. Also apparatus 10 can be used equally well in the repair or maintenance of plumbing in a ceiling; repairing or installing light and ventilation fixtures; repairing or installing smoke, heat, and security alarm detectors; along with other applications where there is a risk of asbestos becoming airborne.

It is thus seen, that the present invention provides a simple and inexpensive apparatus and method for safely and efficiently inspecting or removing asbestos material from a localized area of a structure, such as a ceiling or a wall, without the need to seal off an entire room or section of a building, and without the need for the operator to wear a full asbestos isolation suit.

While the invention has been particularly shown, described and illustrated in detail with reframe to preferred embodiments and modifications thereof, it should be understood by those skilled in the art that the foregoing and other modifications are exemplary only, and that equivalent changes in form and detail may be made therein without departing from the true spirit and scope of the invention as claimed.

The embodiments of the invention for which an exclusive privilege and property right is claimed are defined as follows:

1. A system for isolating a localized portion of a to-be-treated structure by adjustably supporting an opening of a debris containment bag around a to-be-treated portion of a structure, comprising:
   a base;
   a bag attachment frame defining an open area, and including means for releasably receiving open bags, wherein said bag attachment frame is adjustable so that it is adjusted to releasably receive bags having different size openings; and
   an adjustable means connected to and carried by said base and affixed to said bag attachment frame for adjusting the location of said bag attachment frame and the opening of an attached bag around a to-be-treated portion of a structure to thereby isolate such a to-be-treated portion when a bag is present.

2. The system as described in claim 1 wherein said adjustable means includes a plurality of independently extensible support elements, said independently extensible support elements including means for connection to and support of said bag attachment frame for positioning said bag attachment frame and the opening of a bag which is carried by said bag attachment frame towards and away from a to-be-treated portion of a structure.

3. The system as described in claim 2 wherein said extensible support elements are telescoping rods.

4. The system as described in claim 2 wherein said base further includes a bottom pan.

5. The system as described in claim 4 wherein said extensible support elements are telescoping support rods, each rod having a first end and a second end, and said bottom pan carries a plurality of sleeves for receiving said first ends of said support rods, said second ends of said support rods being linked to said bag attachment frame.

6. The system as described in claim 4, wherein said bottom pan includes a plurality of roller devices for said system to be rolled into position substantially below or adjacent to a to-be-treated portion of a structure.

7. The system as described in claim 1 wherein a debris containment bag having an opening is releasably attached in an open position to said bag attachment frame.

8. The system as described in claim 7 wherein said debris containment bag is fluid impermeable.

9. The system as described in claim 7 wherein said debris containment bag carries at least one glove body to allow an operator to use said glove body to work within said bag on an isolated to-be-treated portion of a structure.

10. The system as described in claim 8 wherein said debris containment bag includes means for controllably spraying liquids into said bag.

11. The system as described in claim 8 wherein said debris containment bag includes means for exhausting gases from said bag in order to create a negative pressure within said bag in a manner which reduces or eliminates the ability for debris within said bag to become air entrained.

12. The system as described in claim 7 wherein said debris containment bag is fluid impermeable, carries at least one glove body to allow an operator to use said glove body to work within said bag on an isolated to-be-treated portion of a structure, includes means which are reachable by said glove body for controllably spraying liquids into said bag, and also includes means for exhausting gases from said bag in order to create a negative pressure within said bag in a manner which reduces or eliminates the ability for material within the bag from becoming air entrained.

13. A system for isolating a localized portion of a to-be-treated structure by adjustably supporting an opening of a debris containment bag around a to-be-treated portion of a structure, comprising:
   a base, including a bottom pan and a plurality of roller means for rolling said system into position substantially below or adjacent to a to-be-treated portion of a structure;
   an adjustable means for connection to and carried by said base, said adjustable means including a plurality of independently extendible telescoping support rods, each of said support rods having a first end and a second end, and wherein said bottom pan carries a plurality of sleeves for receiving said first ends of said support rods; and
   a bag attachment frame defining an open area, said bag attachment frame being affixed to said second ends of said support rods which include means for connecting to and for supporting said bag attachment frame, said bag attachment frame being adjustable so that it is adjusted to releasably receive open bags having different size openings, whereby, a debris containment bag having an opening is attached to said bag attachment frame, and said adjustable means is adjusted to locate said bag attachment frame and the opening of an attached bag around a to-be-treated portion of a structure to thereby isolate said to-be-treated portion when a bag is present.

14. The system as described in claim 13, wherein a fluid impermeable, debris containment bag having an opening is releasably attached in an open position to said bag attachment frame, and in which said bag carries at least one glove body to allow an operator to use said glove body to work within said bag on an isolated to-be-treated portion of a structure, said containment bag includes means which are reachable by said glove body for controllably spraying liquids within said bag, and also includes means for exhausting gases from said bag in a manner which creates a negative pressure within said bag to thereby reduce or eliminate the ability for material within the bag, from becoming air entrained.

* * * * *